(12) United States Patent  
Osaki

(10) Patent No.: US 7,111,139 B2  
(45) Date of Patent: Sep. 19, 2006

(54) DATA SYNCHRONIZATION OF MULTIPLE REMOTE STORAGE

(75) Inventor: Nobuyuki Osaki, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 10/792,550

(22) Filed: Mar. 2, 2004

(65) Prior Publication Data

US 2005/0198453 A1  Sep. 8, 2005

(51) Int. Cl.
*G06F 12/00* (2006.01)

(52) U.S. Cl. .................. 711/162; 711/161; 707/204

(58) Field of Classification Search ........ 711/161–162; 707/200–207
See application file for complete search history.

(56) References Cited

U.S. PATENT DOCUMENTS

| | | | |
|---|---|---|---|
| 5,280,611 | A | 1/1994 | Mohan et al. |
| 5,682,513 | A | 10/1997 | Candelaria et al. |
| 6,324,654 | B1 | 11/2001 | Wahl et al. |
| 6,330,568 | B1 | 12/2001 | Boothby et al. |
| 6,574,709 | B1 | 6/2003 | Skazinski et al. |
| 6,604,205 | B1 | 8/2003 | Huang |
| 2003/0177321 | A1 | 9/2003 | Watanabe |
| 2003/0177322 | A1 | 9/2003 | Crockett et al. |
| 2003/0200387 | A1 | 10/2003 | Urabe et al. |
| 2004/0030837 | A1 | 2/2004 | Geiner et al. |

FOREIGN PATENT DOCUMENTS

JP  2002358222 A  12/2002

*Primary Examiner*—Nasser Moazzami
(74) *Attorney, Agent, or Firm*—Townsend and Townsend and Crew LLP

(57) ABSTRACT

A storage system comprises a plurality of storage subsystems. One storage subsystem as a succeeding subsystem is configured to receive and store one or more blocks of data from another storage subsystem as a preceding subsystem. Each block of data has an associated sequence number in ascending order. The memory in each storage subsystem includes a queue to store the blocks of data and a sequence number associated with each block of data, a record to store a last sequence number associated with a last block of data received by the queue, and a table to store last sequence numbers stored in the last sequence number record gathered from each succeeding storage system. In some embodiments, a smallest last sequence number is determined from the last sequence numbers associated with the blocks of data in the storage subsystems. Blocks of data in the queue of each storage subsystem having associated sequence numbers less than or equal to the determined smallest last sequence number are deleted. In case of a failure of one or more storage subsystems, blocks of data are copied from the surviving storage subsystem having associated sequence numbers higher than the last sequence number of other surviving storage subsystems.

20 Claims, 8 Drawing Sheets

| Successor # | Last Seq # |
|---|---|
| 204 | #3 |
| 205 | #2 |

Figure 6.

DATA SYNCHRONIZATION OF MULTIPLE REMOTE STORAGE

CROSS-REFERENCES TO RELATED APPLICATIONS

Not Applicable

BACKGROUND OF THE INVENTION

The present invention relates generally to data processing storage systems which include a primary (or local) storage facility and two or more secondary (or remote) storage facilities that mirror at least certain of the data retained by the primary storage facility. More particularly, the invention relates to a method, and apparatus implementing that method, to synchronize the data at surviving storage facilities in the event of an interruption in copying data from one storage location to another storage location.

Extensive use of data processing by commercial, governmental and other entities has resulted in tremendous amounts of data being stored—much of it of extreme importance to the day-to-day operation of such entities. For example, enormous numbers of financial transactions are now performed entirely electronically. Businesses such as airline companies risk chaos should data regarding future ticketed reservations be lost. As a result of the need for reliable data, local data is usually backed up, often to a remote location, with one or more copies of the data retained for use should the original data be corrupted or lost. The more important the data, the more elaborate the methods of backup. For example, one approach to protecting sensitive or valuable data is to store backup copies of that data at sites that are geographically remote from the local storage facility. Each remote storage facility maintains a mirror image of the data held by the local storage facility, and revises that stored data to "mirror" changes to the local data image of the local storage facility as it is changed. One example of a remote storage system for mirroring data at a local storage system is described in U.S. Pat. No. 5,933,653, entitled "Method and Apparatus for Mirroring Data in a Remote Data Storage System."

Updated data sent to the remote storage facilities are often queued and sent as a group over a network transmission medium such as the Internet, to reduce the overhead of remote copying operations. Thus, the data image mirrored at the remote site and that at the local site will not necessarily be the same. If more than one remote storage is used to mirror the local data, there will be situations in which the data images of the remote storages will be different from one another—at least until updated. These interludes of different data images can be a problem if the local facility fails. Failure of the local storage facility can leave some remote storage facilities with data images that more closely, if not exactly, mirror that of the local storage facility before failure, while others have older "stale" data images that were never completely updated by the last update operation. Thus, failure of the local storage facility may require the remote storage facilities to resynchronize the data among them to assure all have the same latest data image before restarting the system.

One problem which also must be addressed is recovery of the system in the circumstance where a "suspension" occurs during a remote copy operation. An interruption by an unexpected incident, for example, a cache overflow, a storage system failure during copying, a network interruption or other intervention in the remote copy operation, requires that a resynchronization be performed. One approach for resynchronizing remote copy operations is described in U.S. Pat. No. 6,092,066 entitled "Method and Apparatus for Independent Operation of a Remote Data Facility." The technique described in this patent, however, only allows resynchronization in limited circumstances. With certain types of more complex system suspensions, such as a combination of two failures, e.g., a link failure, cache overflow, and/or a drive failure, there is no ready solution to re-synchronizing the system which avoids reinitializing the system. In these types of situations, because this technology does not assure that the configuration will have at least two copies available, a full copy of the volume is usually required for resynchronization.

When the primary site fails due to problems such as a disaster and the primary storage data becomes unavailable, computer systems start their jobs using data in the secondary storage systems. Before the computer systems start using the data in one of the secondary storage systems, the other secondary storage systems need to be synchronized so that the storage systems all have the same data. If the storage systems are not synchronized, the data in the storage systems become inconsistent. When several storage systems are used, each storage system has no way of knowing the copy progress or status of the other storage systems (i.e., what data has been copied). It is virtually impossible to ascertain the differences among storage systems manually. As a result, it may be necessary to copy all data in one storage system which is used for production to all other storage systems in order to synchronize the storage systems, which leads to unnecessarily huge data transaction and long completion time.

BRIEF SUMMARY OF THE INVENTION

Embodiments of the present invention provide an improved data processing storage system in which data is copied downstream from one storage subsystem to another succeeding storage subsystem and information on the copy status is provided upstream from one storage subsystem to another preceding storage subsystem. The storage subsystems typically include a primary storage system and a plurality of secondary storage systems. When data is copied from a primary storage system to one or more succeeding secondary storage systems downstream, each secondary storage system stores the copy status update in a queue in a time sequential manner using a last sequence number and reports the last sequence number of the received data upstream to preceding storage subsystems. In case of any storage subsystem or site failures, the queue of the storage subsystem that has received the last data, as determined by the last sequence number, is identified. A sequence of data is also detected which has not been received by each of the other storage subsystems, and is sent to those storage subsystems respectively. Because the last sequence number in each storage subsystem is shared, each storage subsystem can recognize erasable data in the queue which is not needed for data synchronization with other storage subsystems. In short, the last sequence number of data received and stored in the queue of each storage subsystem is exchanged or shared with other storage subsystems, and is used to copy data among the storage subsystems for data synchronization during a failure. The amount of data stored in the queue of each storage subsystem to provide for data synchronization in case of failure is kept to a minimum, and the amount of data that need to be copied among the storage subsystems for data synchronization is reduced.

In accordance with an aspect of the present invention, a storage system comprises a plurality of storage subsystems. The plurality of storage subsystems each include a memory and a storage medium for storing data. The plurality of storage subsystems include at least one first storage subsystem and at least one second storage subsystem. The first storage subsystem is connected to the second storage subsystem which is configured to receive and store one or more blocks of data from the first storage subsystem. The first storage subsystem is a preceding storage subsystem to the second storage subsystem. The second storage subsystem is a succeeding storage subsystem to the first storage subsystem. Each block of data being copied has an associated sequence number in ascending order. The memory in each of the storage subsystems includes a queue to receive and store the one or more blocks of data and a sequence number associated with each block of data, a last sequence number record to store a last sequence number associated with a last block of data received by the queue, and a table to store a last sequence number stored in the last sequence number record of each succeeding storage system connected to the storage subsystem.

In some embodiments, the plurality of storage subsystems include at least one third storage system which is connected to the second storage system to receive and store one or more blocks of data from the second storage subsystem. The second storage subsystem is a preceding storage subsystem to the third storage subsystem. The third storage subsystem is a succeeding storage subsystem to the second storage subsystem.

In specific embodiments, each storage subsystem includes a processor configured to search the smallest last sequence number in the table. The processor is configured to compare the smallest last sequence number in the table and a smallest last sequence number identified in each succeeding storage subsystem to determine the smallest last sequence number of the storage subsystem. The processor is configured to report the smallest last sequence number of the storage subsystem to each succeeding storage subsystem and any preceding storage subsystem. If a storage subsystem has a preceding storage subsystem, the processor of the storage subsystem is configured, upon receiving the smallest last sequence number from the preceding storage system, to delete blocks of data in the queue of the storage subsystem having associated sequence numbers less than or equal to the received smallest last sequence number. If a storage subsystem has no preceding storage subsystem, the processor of the storage subsystem is configured, upon determining the smallest last sequence number of the storage system, to delete blocks of data in the queue of the storage subsystem having associated sequence numbers less than or equal to the received smallest last sequence number.

In some embodiments, each storage subsystem includes a processor configured, in case of a failure of one or more storage subsystems, to compare the last sequence number stored in the last sequence number record of the storage subsystem with the last sequence numbers stored in the last sequence number record of other surviving storage subsystems and, if the last sequence number stored in any one of the other surviving storage subsystems is larger than the last sequence number stored in the storage subsystem, to copy blocks of data from the one surviving storage subsystem having associated sequence numbers higher than the last sequence number of the storage subsystem to the queue of the storage subsystem.

Another aspect of the present invention is directed to a method for managing data stored in a storage system having a plurality of storage subsystems. The method comprises copying one or more blocks of data from one storage subsystem to a succeeding storage subsystem connected to the one storage subsystem and storing each block of data copied and the associated sequence number in a queue in the memory of the succeeding storage subsystem; storing a last sequence number in a last sequence number record in the memory of the succeeding storage subsystem; and storing in a table in the memory of each storage subsystem a last sequence number in the last sequence number record of each succeeding storage system connected to the storage subsystem.

Another aspect of the present invention is directed to a method for managing data stored in a storage system having a plurality of storage subsystems. The method comprises copying one or more blocks of data from one storage subsystem to a succeeding storage subsystem connected to the one storage subsystem and storing each block of data copied and the associated sequence number in a queue in the memory of the succeeding storage subsystem; determining a smallest last sequence number from the last sequence numbers associated with the blocks of data in the storage subsystems; and deleting blocks of data in the queue of each storage subsystem having associated sequence numbers less than or equal to the determined smallest last sequence number.

BRIEF DESCRIPTION OF THE DRAWINGS

FIG. 6 is a table containing copy status update information according to an embodiment of the present invention.

DETAILED DESCRIPTION OF THE INVENTION

Figure 1:
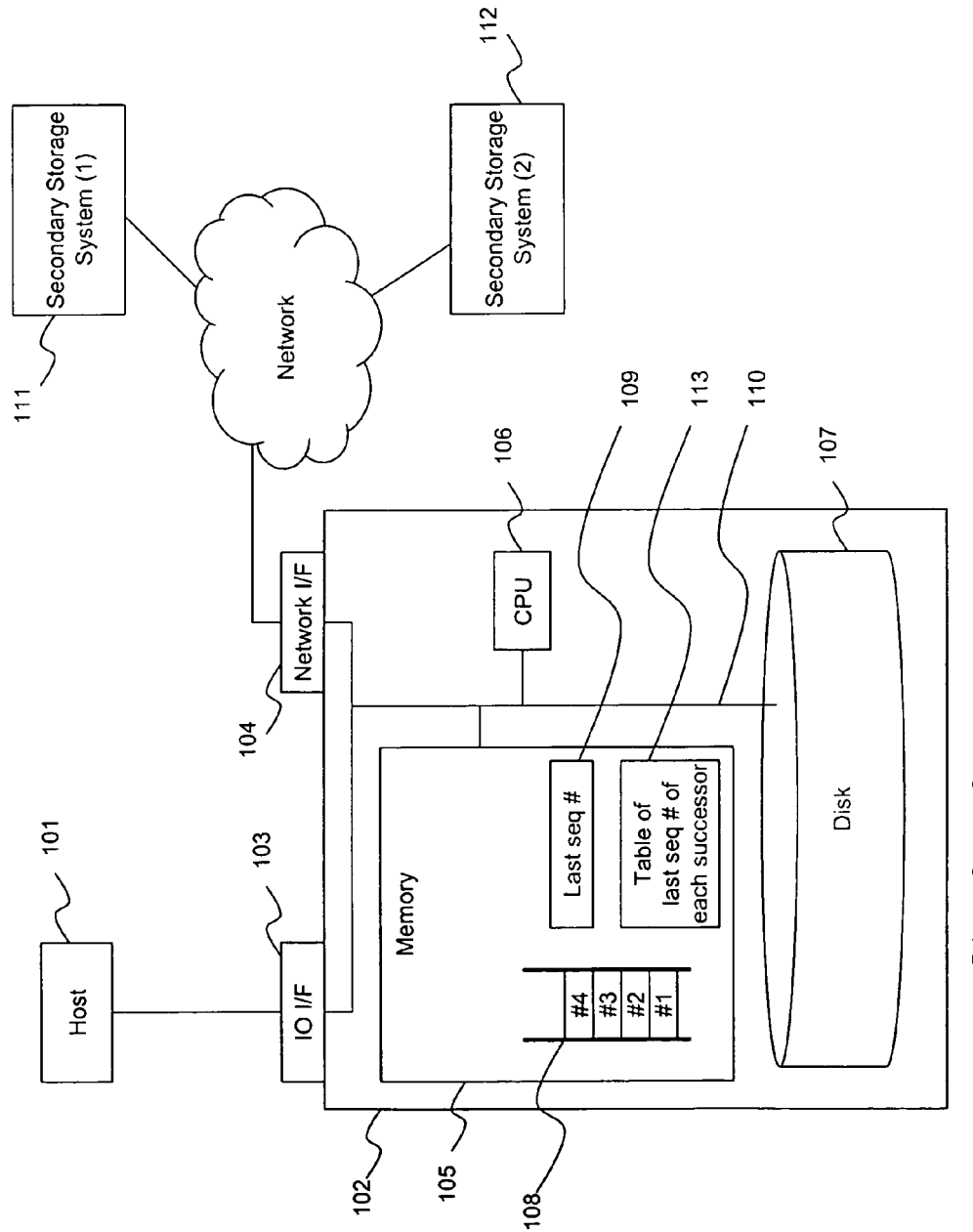
FIG. 1 is a schematic diagram illustrating a storage system having a plurality of storage subsystems according to an embodiment of the present invention.

FIG. 1 shows a storage system 100 having a host system 101 and a plurality of storage subsystems. The storage subsystems include a primary storage system 102 and a plurality of secondary storage systems 111, 112. The host system 101 is connected to the primary storage system 102 through an IO interface 103 through which input and output are transmitted. Data or information entering the primary storage system 102 is processed by the processor or CPU 106 using the memory 105, and may be stored in the disk or storage medium 107, which may be RAID or just a bunch of disks (JBOD). The memory 105 includes a queue 108 for storing blocks of data and associated sequence numbers, a record 109 for storing the last sequence number, and a table 113 for storing last sequence numbers of succeeding storage systems, as described in greater detail below. An internal bus 110 is provided for conveying internal data. A network interface 104 is coupled to a network to facilitate communication with other systems such as secondary storage systems to copy data or to transmit or receive information. Data is copied from the primary storage system 102 to the secondary storage systems 111, 112 in a downstream direction. The data from the disk 107 flows from the primary storage system 102 through the network interface 104 via the network to one or more target secondary storage systems. The other storage subsystems (secondary storage systems) desirably have a similar configuration including the memory 105, processor 106, and storage medium 107.

Figure 2:
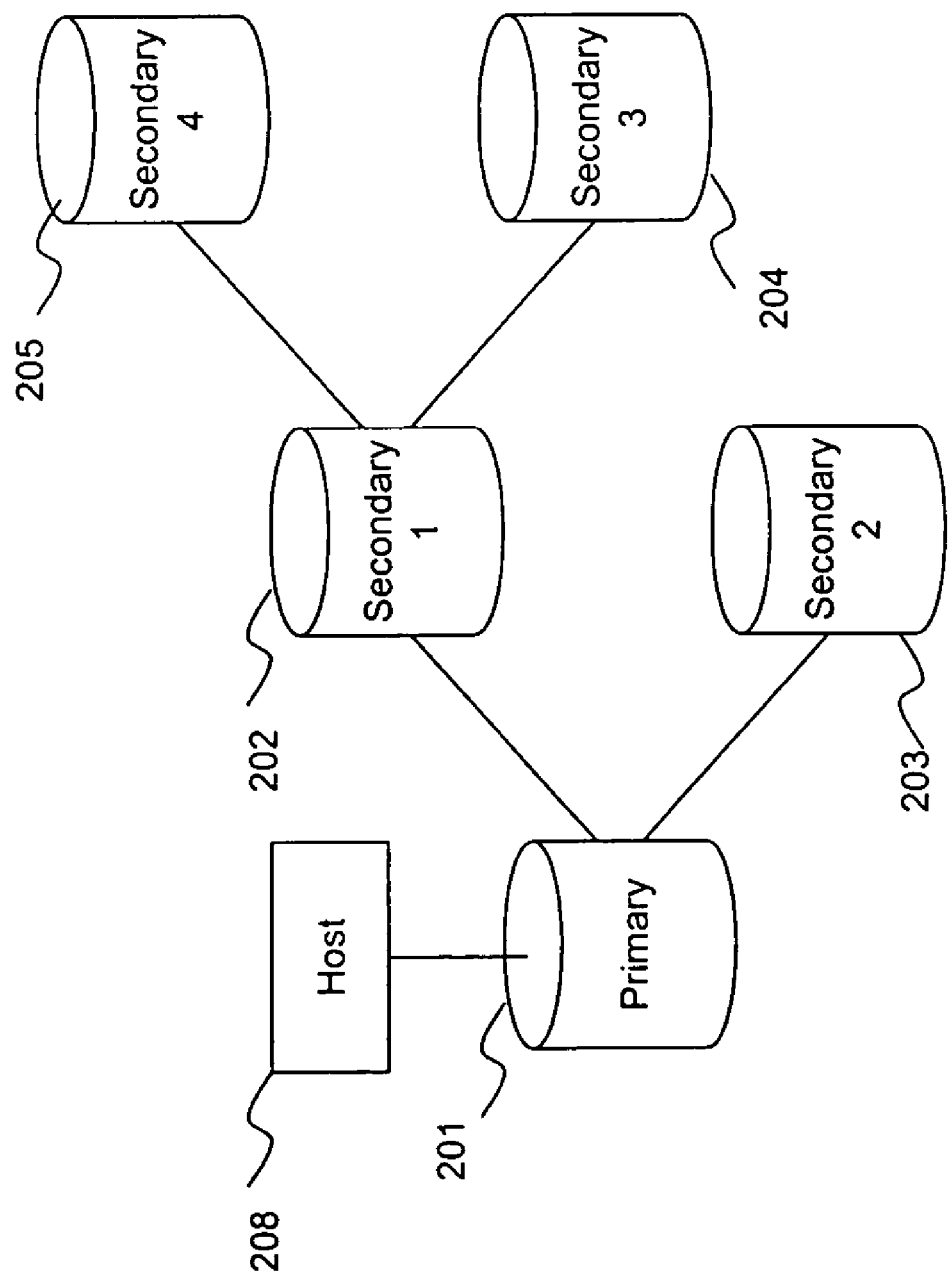
FIG. 2 is a schematic diagram illustrating the logical system configuration of a storage system according to an embodiment of the present invention.

FIG. 2 is a schematic diagram illustrating the logical system configuration of a storage system 200, which includes a host system 208, a primary storage system 201, and a plurality of secondary storage systems 202–205. As in the system of FIG. 1, the primary storage system 201 is a system whereby inputs or outputs from the host system 208 are read or written. In this storage system 200, the data in the primary storage system 201 is intended to be copied to the secondary storage systems 202-205. The storage system 202 has a cascading structure of storage systems in which the secondary storage systems 202, 203 are first level secondary storage systems and the secondary storage systems 204, 205 are second level secondary storage systems. Data is copied from the primary storage system 201 to the first level secondary storage systems 202, 203 which are connected to the primary storage system 201 as immediately succeeding systems. Then data is copied from the first level secondary storage system 202 to the second level secondary storage systems 204, 205 which are connected to the first level secondary storage system 202 as immediately succeeding systems. Using another terminology, the primary storage system 201 is a first storage subsystem which is a preceding storage subsystem to second storage subsystems 202 and 203, while third storage subsystems 204 and 205 are succeeding storage subsystems to the second storage subsystem 202. Each storage system has the knowledge of connected storage subsystems by detecting the connection automatically or being inputted manually.

During the copy process, data blocks transmitted from one storage system to another storage system are ordered in a write sequential manner as performed by the host system 208 at the primary storage system 201. Each block of data is also accompanied by a sequence number assigned to that block at the primary storage system 201, typically in ascending order from #1, #2, and so on.

Figure 3:
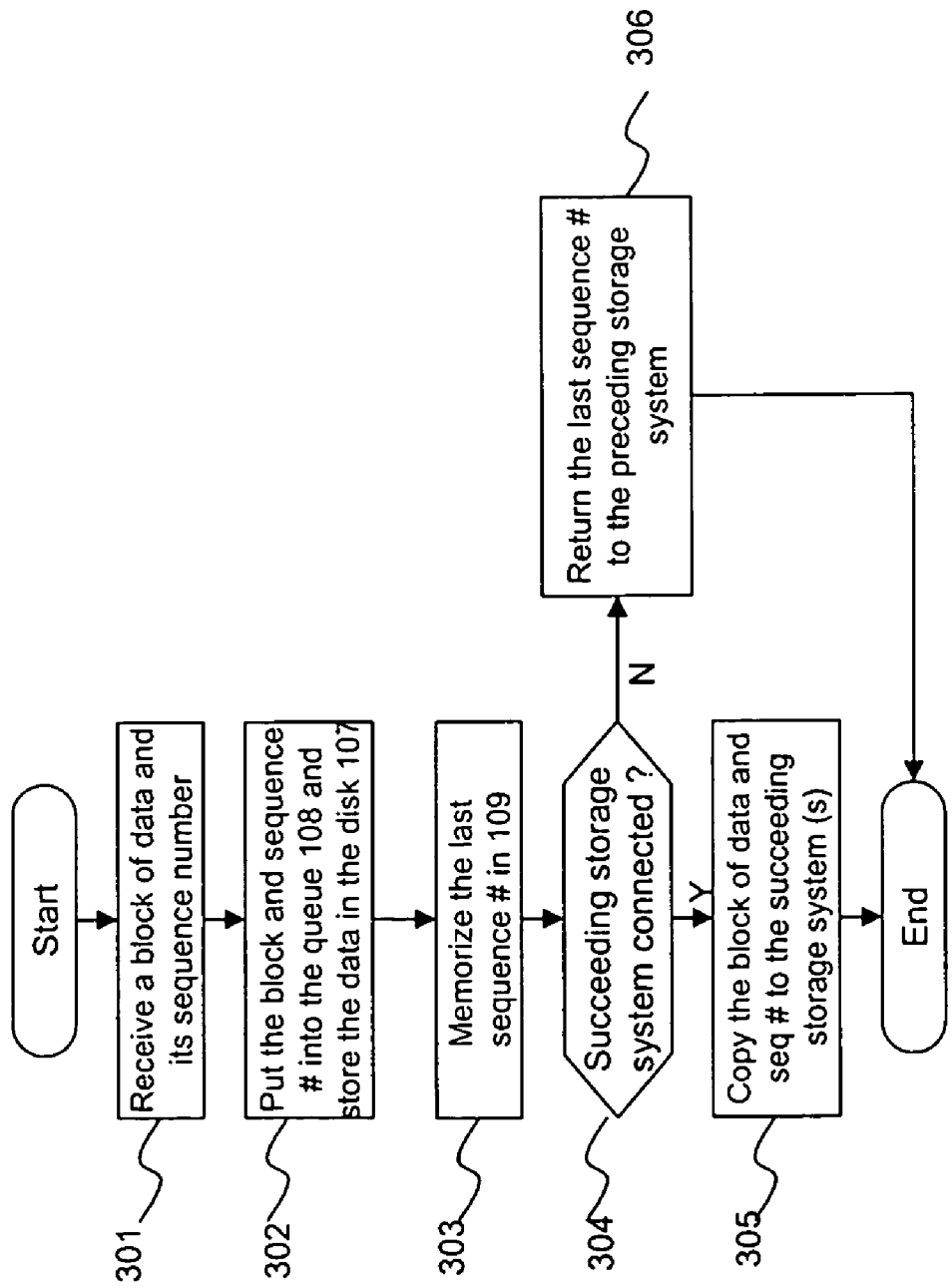
FIG. 3 is a flow diagram illustrating a copy process according to an embodiment of the present invention.

FIG. 3 illustrates a copy process for a storage subsystem such as one of the secondary storage systems. The subsystem receives a block of data and its sequence number from an immediately preceding subsystem connected thereto in step 301. As used herein for convenience, the term "preceding" is construed as "immediately preceding" and the term "succeeding" is construed as "immediately succeeding" in describing the relationship between storage subsystems. In step 302, the data block and sequence number are initially stored in a queue of the memory of the subsystem (see, e.g., the queue 108 in the memory 105 in FIG. 1) to keep its write sequential order, and the data is stored in the storage medium (see, e.g., the disk 107 in FIG. 1). Data stored in the queue 108 may be also stored in the disk 107 immediately after it is stored in the queue 108 or after a certain period of time. The data can be stored in the disk 107 even before being stored in the queue 108. The last sequence number accompanying the last block of incoming data is stored in the last sequence number record (see, e.g., the record 109 in FIG. 1) in step 303. If the particular storage subsystem has one or more succeeding storage subsystems, then the incoming data and its sequence number are transferred to the succeeding storage subsystems in step 305. For example, the storage subsystem 202 in FIG. 2 has succeeding storage subsystems 204, 205, while the storage subsystem 201 is the preceding storage subsystem to the storage subsystem 202. If the particular storage subsystem does not have any succeeding storage subsystems, its last sequence number is returned to the preceding storage system in an upstream flow (step 306).

Figure 4:
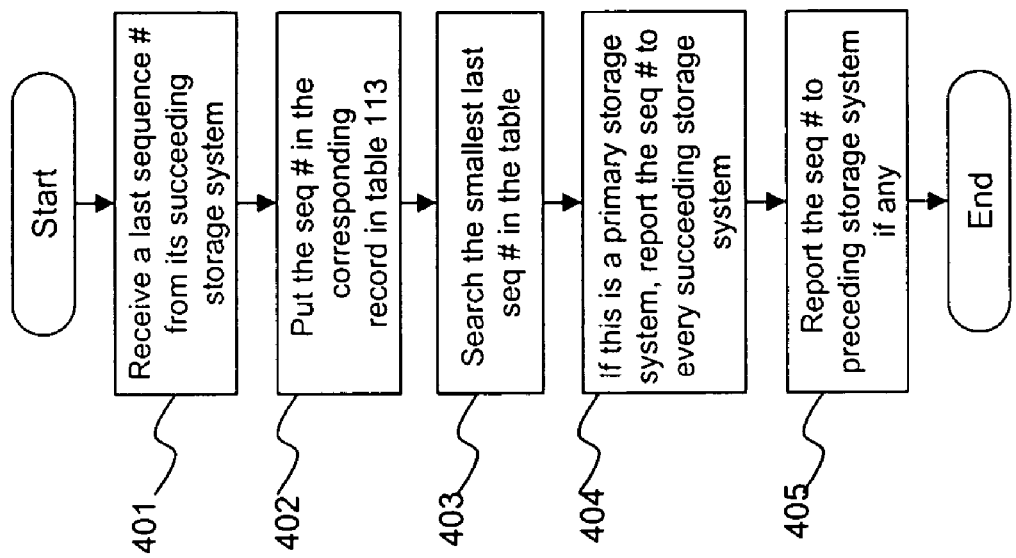
FIG. 4 is a flow diagram illustrating a copy status update process associated with the copy process according to an embodiment of the present invention.
Figure 6:
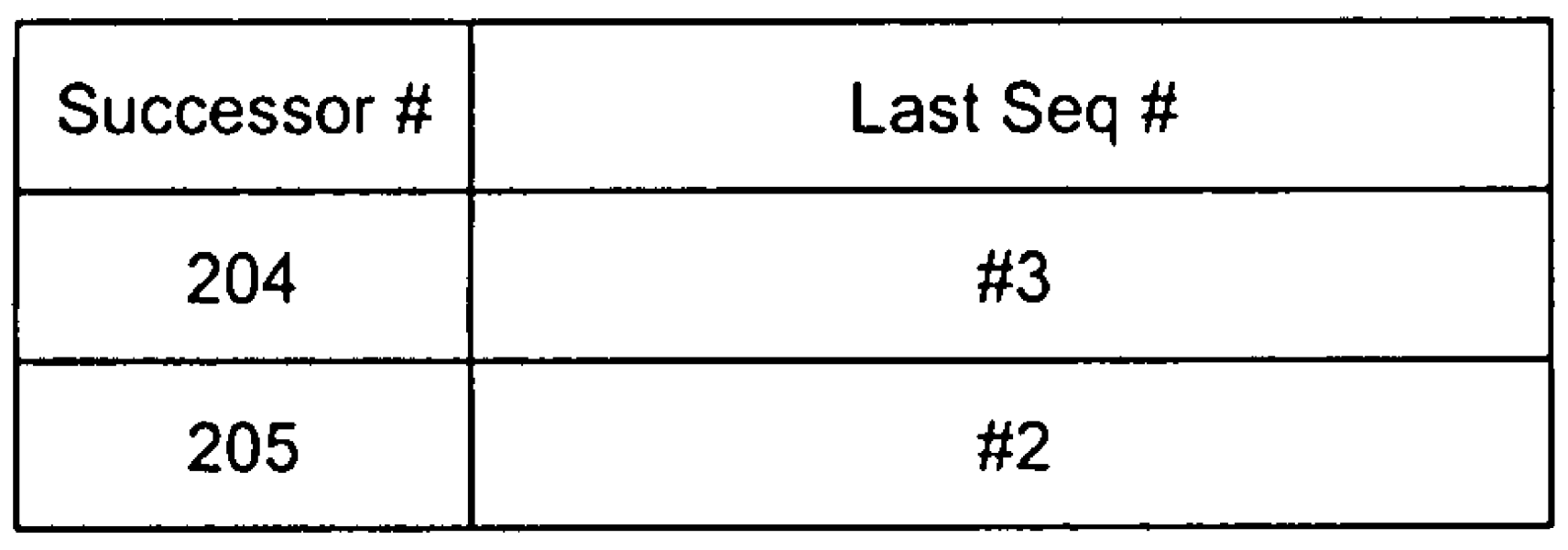

FIG. 4 is a flow diagram illustrating a copy status update process associated with the copy process of FIG. 3. The copy status update process begins when a storage subsystem receives a last sequence number from its succeeding storage subsystem (step 401). In step 402, the storage subsystem updates the last sequence number field of the corresponding succeeding storage subsystem in the table with the received sequence number (see, e.g., the table 113 in FIG. 1). This table 113 contains the last sequence number of each succeeding storage subsystem. FIG. 6 shows an example of such a table. The storage subsystem searches for the smallest last sequence number in the table in step 403. The smallest last sequence number is the sequence number accompanying the oldest data block in the storage system. The search in the table in step 403 can be performed either immediately after the storage subsystem receives the last sequence number from one of the succeeding storage systems or after a certain period of time which is preset, for example, by the primary storage system 201 or the host system 208 in FIG. 2. During the very initial period just after the storage system is configured and the copy has started, it may happen that every last sequence field of the table 113 is not filled with corresponding last sequence number of succeeding storage subsystem. In such a case, this search is performed after every field is filled with last sequence number received from corresponding succeeding storage subsystem. Of course, if the storage subsystem has only one succeeding storage subsystem, this search and comparison can be omitted. The storage subsystem then reports the smallest last sequence number to every succeeding storage system in step 404, as well as to the preceding storage subsystem, if any, in step 405. A header may be added to the smallest last sequence number to identify such a number. It is noted that step 404 and step 405 do not need to be performed in the order shown in FIG. 4, but the order may be reversed.

Figure 5:
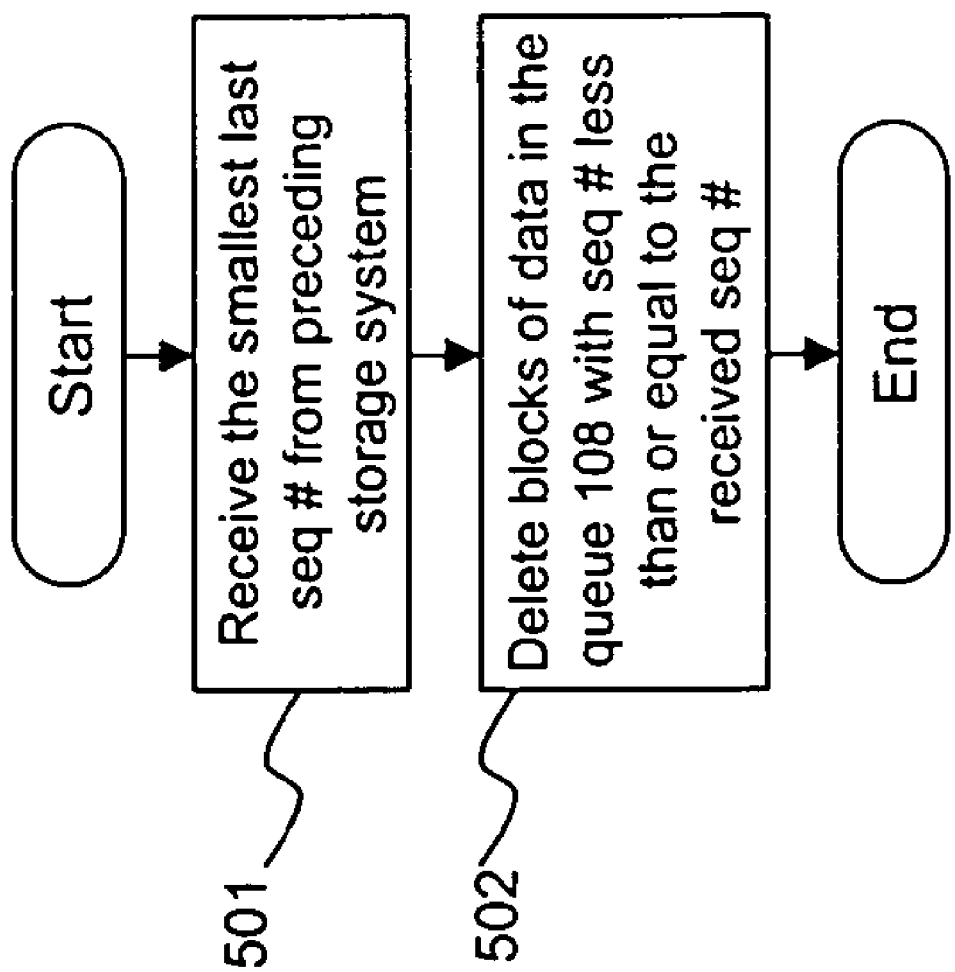
FIG. 5 is a flow diagram illustrating a data deletion process based on copy status update information of the copy status update process according to an embodiment of the present invention.

FIG. 5 is a flow diagram illustrating a data deletion process based on copy status update information of the copy status update process. The data deletion process begins when a storage subsystem receives the smallest last sequence number from its preceding storage system in step 501. The storage subsystem is allowed to delete any blocks of data in the queue (see, e.g., the queue 108 in FIG. 1) which have associated sequence numbers less than or equal to the received smallest last sequence number (step 502). This data deletion may be performed either immediately after the storage subsystem receives the smallest last sequence number from its preceding storage subsystem or after a specified time has elapsed. For the primary storage system 201 which has no preceding storage system, the smallest last sequence number is determined in step 403 of FIG. 4 based on the search in the table and any smallest last sequence number received from each succeeding storage subsystem. The primary storage system 201 can delete blocks of data in the queue 108 with sequence numbers less than or equal to the determined smallest last sequence number.

Employing the copy status update process and the data deletion process, the present embodiment provides a method to synchronize data between multiple storage subsystems in case of subsystem failure while eliminating unnecessary data transactions. Advantageously, each storage subsystem does not need to know the entire storage system configuration, such as how many storage subsystems are deployed for the primary storage subsystem's data backup and how the storage subsystems are connected with each other. Each storage subsystem needs only to know information about the "immediately" preceding storage subsystem (from which data is copied to the subject storage subsystem) and information about the "immediately" succeeding storage subsystem (to which data is copied from the subject storage subsystem) in order to exchange necessary information in case of a subsystem failure and to keep the redundancy of the data needed for synchronization (i.e., storing last sequence numbers and copying data for data synchronization in case of subsystem failure).

Figure 7:
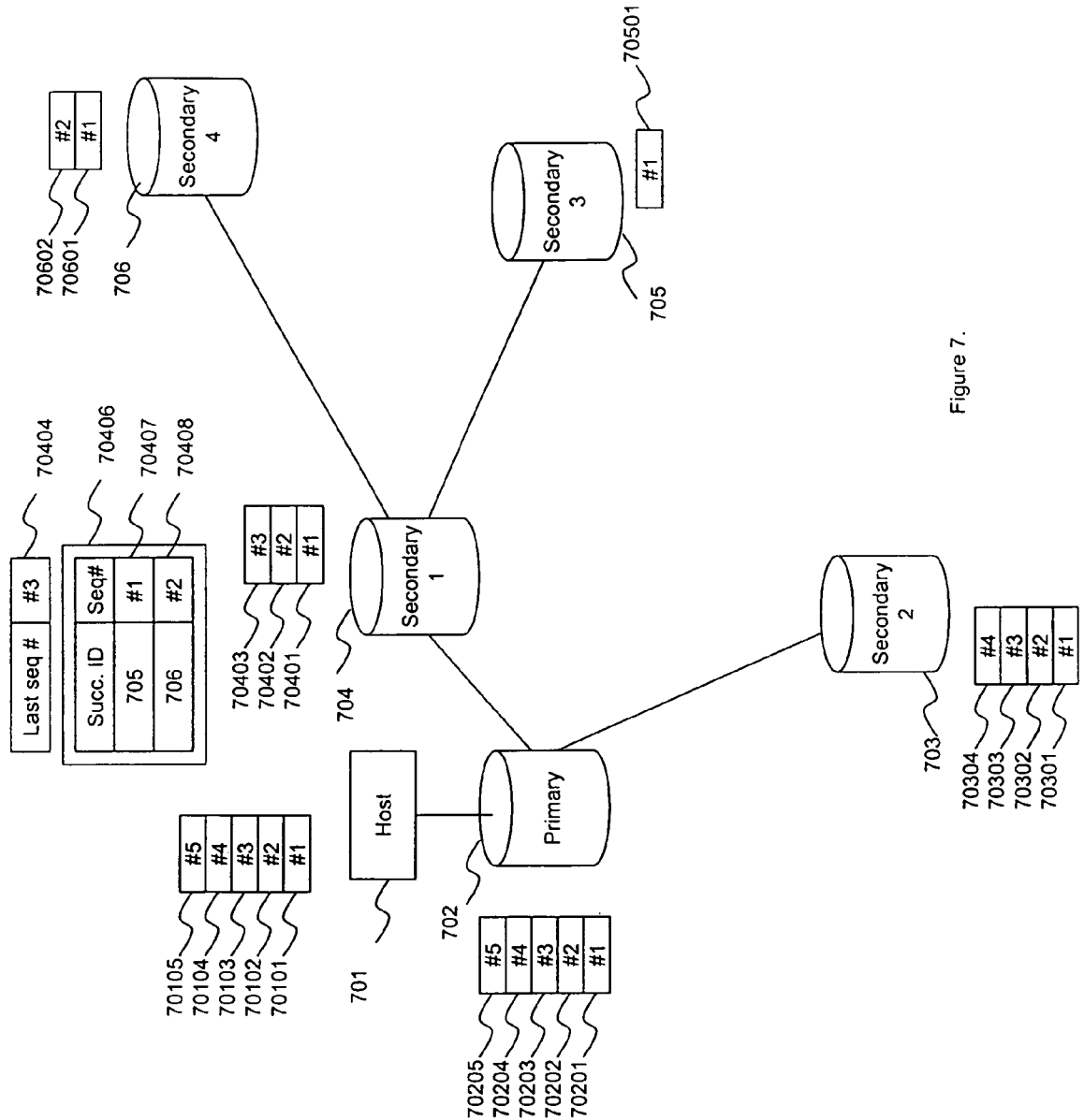
FIG. 7 is an abstracted configuration illustrating a snapshot of the storage subsystems in a storage system during a copy process according to an embodiment of the present invention.

FIG. 7 is an abstracted configuration illustrating a snapshot of the storage subsystems in a storage system during a copy process. The host system 701 is connected to the primary storage system 702, and writes data to that system 702. The data in the primary storage system 702 is copied to first level succeeding secondary storage systems 703, 704 connected thereto. The data in the first level secondary storage system 704 is copied to second level succeeding secondary storage subsystems 705, 706 connected thereto.

FIG. 7 is a snapshot of the storage subsystems where a copy operation is in progress. Blocks of data 70101–70105 are ordered in a time sequential manner, are created at the host system 701, and then are written in the queue 108 of the primary storage system 702. As shown in FIG. 7, the blocks of data 70201–70205 are the written blocks of data in the queue 108. At this moment in time, the blocks of data 70201 to 70204 are copied to the secondary storage system 703, which are stored in the queue as corresponding blocks of data 70301 to 70304. The blocks of data 70201 to 70203 are copied to the secondary storage system 704, which are stored in the queue as blocks of data 70401 to 70403. The blocks of data 70401 to 70402 in the secondary storage system 704 are copied to the secondary storage system 706, which are stored in the queue as blocks of data 70601 to 70602. The block of data 70401 is copied to the secondary storage system 705, which is stored in the queue as the block of data 70501.

The last sequence number record 109 and the table 113 of last sequence number of each successor are only shown for the storage subsystem 704 as 70404 and 70406, respectively. Once the storage subsystem 704 has received the last sequence numbers from its succeeding storage subsystems 705, 706 (which are #1 in the record 70407 and #2 in the record 70408, respectively), the storage subsystem 704 reports the smallest last sequence number in the table 70406 (which is #1 in the record 70407) to its preceding storage subsystems 702.

At the storage subsystem 702, the smallest last sequence number #1 has been reported from the storage subsystem 704, and the last sequence number #4 has been reported from the storage subsystem 703 (which is also the smallest last sequence number in the storage subsystem 703). The smallest last sequence number reported to the storage subsystem 702 is thus #1, and this smallest last sequence number #1 is reported to the succeeding storage subsystems 703, 704. Therefore, the storage subsystems 702, 703, 704 are allowed to delete data blocks which have sequence numbers equal to or smaller than the reports smallest last sequence number (#1) at any time. Then the storage system 704 reports this smallest last sequence number to the second level succeeding storage subsystems 705, 706, and storage subsystems 705 and 706 are allowed to delete data blocks which have sequence numbers equal to or smaller than the reported smallest last sequence number (#1) at any time.

Figure 8:
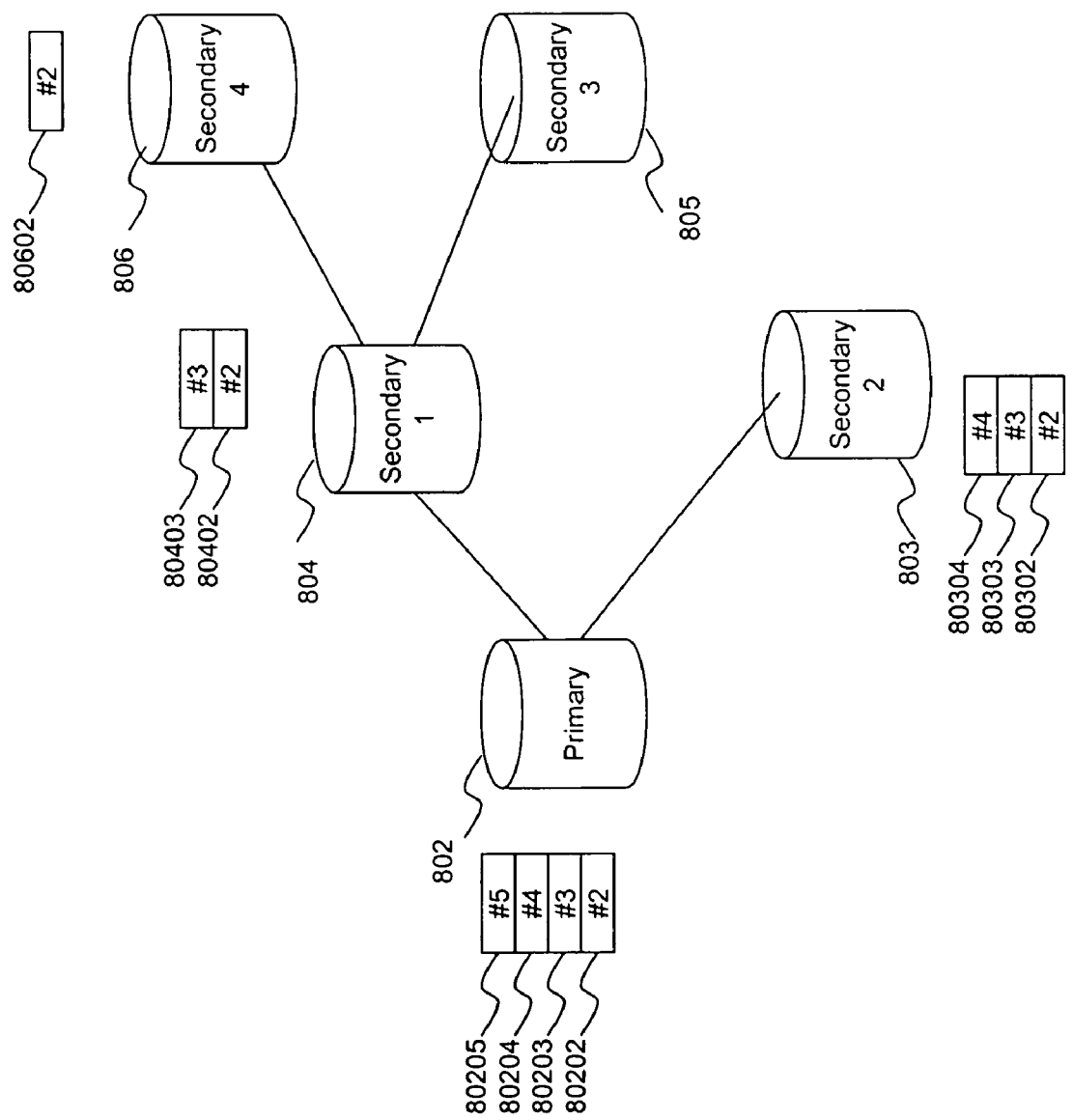
FIG. 8 is an abstracted configuration illustrating the state of data in the storage subsystems of a storage system during a copy process and associated copy status update process and data deletion process.

FIG. 8 is an abstracted configuration illustrating the state of data in the storage subsystems of a storage system as a result of data deletion process which is applied to the state of data shown in FIG. 7. More specifically, FIG. 8 shows the state in which each data block #1 (80201, 80301, 80401, 80501, 80601) is deleted from each queue of the corresponding storage subsystem (802, 803, 804, 805, 806). In the event of a failure of a storage subsystem, the mechanism to synchronize data among the storage subsystems is illustrated.

In one example, the primary storage system 802 fails or is otherwise unavailable. The last block of data that remains in the storage system configuration is data block 80304 in the storage subsystem 803 having the sequence number #4 (i.e., the largest last sequence number). This sequence number is distributed to all other storage subsystems. This distribution can be performed through the network that is used for data copy transactions by putting distribution logic in each storage subsystem, or it can be done by additional server(s) having a mechanism to be connected with every storage subsystem. The other storage subsystems (804, 805, 806) will need to have blocks of data with sequence numbers up to #4. Because the storage subsystem 804 has its own last sequence number in the record 109 (which is #3), the storage subsystem 804 knows that only the data block 80304 needs to be copied to itself. By communicating this information through the network or server(s), the data copy request of data block 80304 is issued and the block of data can be copied to the storage system 804. The storage subsystems 805, 806 each know that it needs data blocks of 80304, 80303, 80302 for the storage subsystem 805 to be copied, and data blocks of 80303, 80304 for the storage subsystem 806 to be copied. The copying is performed using the same mechanism as for the storage subsystem 804.

In another example, the storage subsystem 804 fails or is otherwise unavailable. It is assumed that the storage subsystems 804 and 806 are unavailable. The last block of data which remains in the storage system configuration is data block 80205 in storage system 802 with sequence number #5. The storage subsystems 803, 805 need to be copied with data block 80205 and data blocks 80202 to 80205, respectively.

Every storage subsystem can be synchronized with the storage subsystem which has the newest data. Blocks of data are stored in the queues redundantly so that any storage subsystem may fail without resulting in the loss of a substantial amount of data. Unnecessary data blocks can be deleted to reduce the capacity of the queues.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A storage system comprising a plurality of storage subsystems,
   wherein the plurality of storage subsystems each include a memory and a storage medium for storing data,
   wherein the plurality of storage subsystems include at least one first storage subsystem and at least one second storage subsystem, the first storage subsystem being connected to the second storage subsystem which is configured to receive and store one or more blocks of data from the first storage subsystem, the first storage subsystem being a preceding storage subsystem to the second storage subsystem, the second storage subsystem being a succeeding storage subsystem to the first storage subsystem;
   wherein each block of data being copied has an associated sequence number in ascending order,
   wherein the memory in each of the storage subsystems includes a queue to receive and store the one or more blocks of data and a sequence number associated with each block of data, a last sequence number record to store a last sequence number associated with a last block of data received by the queue, and a table to store a last sequence number received from each succeeding storage system connected to the storage subsystem,
   wherein each storage subsystem includes a processor configured to search the smallest last sequence number in the table.

2. The storage system of claim 1 wherein the plurality of storage subsystems include at least one third storage system which is connected to the second storage system to receive and store one or more blocks of data from the second storage subsystem, the second storage subsystem being a preceding storage subsystem to the third storage subsystem, the third storage subsystem being a succeeding storage subsystem to the second storage subsystem.

3. The storage system of claim 1 wherein the processor is configured to report the smallest last sequence number of the storage subsystem to any preceding storage subsystem.

4. The storage system of claim 1 wherein the processor is configured to report the smallest last sequence number of the storage subsystem to each succeeding storage subsystem if the storage subsystem has no preceding storage subsystem.

5. The storage system of claim 4:
   wherein if a storage subsystem has a preceding storage subsystem, the processor of the storage subsystem is configured, upon receiving the smallest last sequence number from the preceding storage system, to delete blocks of data in the queue of the storage subsystem having associated sequence numbers less than or equal to the received smallest last sequence number; and
   wherein if a storage subsystem has no preceding storage subsystem, the processor of the storage subsystem is configured, upon determining the smallest last sequence number of the storage system, to delete blocks of data in the queue of the storage subsystem having associated sequence numbers less than or equal to the received smallest last sequence number.

6. The storage system of claim 1 wherein each storage subsystem includes a processor configured, in case of a failure of one or more storage subsystems, to compare the last sequence number stored in the last sequence number record of the storage subsystem with the last sequence numbers stored in the last sequence number record of other surviving storage subsystems and, if the last sequence number stored in any one of the other surviving storage subsystems is larger than the last sequence number stored in the storage subsystem, to copy blocks of data from the one surviving storage subsystem having associated sequence numbers higher than the last sequence number of the storage subsystem to the queue of the storage subsystem.

7. A method for managing data stored in a storage system having a plurality of storage subsystems each including a memory and a storage medium for storing data, the plurality of storage subsystems including at least one first storage subsystem and at least one second storage subsystem, the first storage subsystem being connected to the second storage subsystem which is configured to receive and store one or more blocks of data from the first storage subsystem, the first storage subsystem being a preceding storage subsystem to the second storage subsystem, the second storage subsystem being a succeeding storage subsystem to the first storage subsystem, each block of data having an associated sequence number in ascending order, the method comprising:
   copying one or more blocks of data from one storage subsystem to a succeeding storage subsystem connected to the one storage subsystem and storing each block of data copied and the associated sequence number in a queue in the memory of the succeeding storage subsystem;
   storing a last sequence number in a last sequence number record in the memory of the succeeding storage subsystem, the last sequence number being associated with a last block of data copied and stored in the queue;
   storing in a table in the memory of each storage subsystem a last sequence number in the last sequence number record of each succeeding storage system connected to the storage subsystem; and
   searching the smallest last sequence number in the table.

8. The method of claim 7 further comprising reporting the smallest last sequence number of the storage subsystem to any preceding storage subsystem.

9. A method for managing data stored in a storage system having a plurality of storage subsystems each including a memory and a storage medium for storing data, the plurality of storage subsystems including at least one first storage subsystem and at least one second storage subsystem, the first storage subsystem being connected to the second storage subsystem which is configured to receive and store one or more blocks of data from the first storage subsystem, the first storage subsystem being a preceding storage subsystem to the second storage subsystem, the second storage subsystem being a succeeding storage subsystem to the first storage subsystem, each block of data having an associated sequence number in ascending order, the method comprising:
   copying one or more blocks of data from one storage subsystem to a succeeding storage subsystem connected to the one storage subsystem and storing each block of data copied and the associated sequence number in a queue in the memory of the succeeding storage subsystem;
   storing a last sequence number in a last sequence number record in the memory of the succeeding storage subsystem, the last sequence number being associated with a last block of data copied and stored in the queue;
   storing in a table in the memory of each storage subsystem a last sequence number in the last seqence number record of each succeeding storage system connected to the storage subsystem; and
   reporting the smallest last sequence number of the storage subsystem to any preceding storage subsystem.

10. The method of claim 9 further comprising reporting the smallest last sequence number of the storage subsystem to each succeeding storage subsystem if the storage subsystem has no preceding storage subsystem.

11. The method of claim 10 further comprising:
if a storage subsystem has a preceding storage subsystem, upon receiving the smallest last sequence number from the preceding storage system, deleting blocks of data in the queue of the storage subsystem having associated sequence numbers less than or equal to the received smallest last sequence number; and
if a storage subsystem has no preceding storage subsystem, upon determining the smallest last sequence number of the storage system, deleting blocks of data in the queue of the storage subsystem having associated sequence numbers less than or equal to the received smallest last sequence number.

12. A method for managing data stored in a storage system having a plurality of storage subsystems each including a memory and a storage medium for storing data, the plurality of storage subsystems including at least one first storage subsystem and at least one second storage subsystem, the first storage subsystem being connected to the second storage subsystem which is configured to receive and store one or more blocks of data from the first storage subsystem, the first storage subsystem being a preceding storage subsystem to the second storage subsystem, the second storage subsystem being a succeeding storage subsystem to the first storage subsystem, each block of data having an associated sequence number in ascending order, the method comprising:
copying one or more blocks of data from one storage subsystem to a succeeding storage subsystem connected to the one storage subsystem and storing each block of data copied and the associated sequence number in a queue in the memory of the succeeding storage subsystem;
storing a last sequence number in a last sequence number record in the memory of the succeeding storage subsystem, the last sequence number being associated with a last block of data copied and stored in the queue;
storing in a table in the memory of each storage subsystem a last sequence number in the last sequence number record of each succeeding storage system connected to the storage subsystem; and
in case of a failure of one or more storage subsystems:
comparing the last sequence number stored in the last sequence number record of the storage subsystem with the last sequence numbers stored in the last sequence number record of other surviving storage subsystems; and
if the last sequence number stored in any one of the other surviving storage subsystems is larger than the last sequence number stored in the storage subsystem, copying blocks of data from the one surviving storage subsystem having associated sequence numbers higher than the last sequence number of the storage subsystem to the queue of the storage subsystem.

13. A method for managing data stored in a storage system having a plurality of storage subsystems each including a memory and a storage medium for storing data, the plurality of storage subsystems including at least one first storage subsystem and at least one second storage subsystem, the first storage subsystem being connected to the second storage subsystem which is configured to receive and store one or more blocks of data from the first storage subsystem, the first storage subsystem being a preceding storage subsystem to the second storage subsystem, the second storage subsystem being a succeeding storage subsystem to the first storage subsystem, each block of data having an associated sequence number in ascending order, the method comprising:
copying one or more blocks of data from one storage subsystem to a succeeding storage subsystem connected to the one storage subsystem and storing each block of data copied and the associated sequence number in a queue in the memory of the succeeding storage subsystem;
determining a smallest last sequence number from the last sequence numbers associated with the blocks of data in the storage subsystems; and
deleting blocks of data in the queue of each storage subsystem having associated sequence numbers less than or equal to the determined smallest last sequence number.

14. The method of claim 13 further comprising:
storing a last sequence number in a last sequence number record in the memory of each storage subsystem; and
storing in a table in the memory of each storage subsystem a last sequence number received from each succeeding storage system connected to the storage subsystem.

15. The method of claim 14 wherein determining the smallest last sequence number further comprises searching the smallest last sequence number in the table of each storage subsystem.

16. The method of claim 15 wherein determining the smallest last sequence number further comprises comparing the smallest last sequence number in the table of each storage subsystem and a smallest last sequence number identified in each succeeding storage subsystem to determine the smallest last sequence number of the storage subsystem.

17. The method of claim 16 further comprising:
reporting the smallest last sequence number of the each storage subsystem to each succeeding storage subsystem and any preceding storage subsystem.

18. The method of claim 17 wherein deleting blocks of data comprising:
if a storage subsystem has a preceding storage subsystem, upon receiving the smallest last sequence number from the preceding storage system, deleting blocks of data in the queue of the storage subsystem having associated sequence numbers less than or equal to the received smallest last sequence number; and
if a storage subsystem has no preceding storage subsystem, upon determining the smallest last sequence number of the storage system, deleting blocks of data in the queue of the storage subsystem having associated sequence numbers less than or equal to the received smallest last sequence number.

19. The method of claim 14, further comprising, in case of a failure of one or more storage subsystems:
comparing the last sequence number stored in the last sequence number record of the storage subsystem with the last sequence numbers stored in the last sequence number record of other surviving storage subsystems; and
if the last sequence number stored in any one of the other surviving storage subsystems is larger than the last sequence number stored in the storage subsystem, copying blocks of data from the one surviving storage subsystem having associated sequence numbers higher than the last sequence number of the storage subsystem to the queue of the storage subsystem.

20. A storage system comprising a plurality of storage subsystems,
- wherein the plurality of storage subsystems each include a memory and a storage medium for storing data,
- wherein the plurality of storage subsystems include at least one first storage subsystem and at least one second storage subsystem, the first storage subsystem being connected to the second storage subsystem which is configured to receive and store one or more blocks of data from the first storage subsystem, the first storage subsystem being a preceding storage subsystem to the second storage subsystem, the second storage subsystem being a succeeding storage subsystem to the first storage subsystem;
- wherein each block of data being copied has an associated sequence number in ascending order,
- wherein the memory in each of the storage subsystems includes a queue to receive and store the one or more blocks of data and a sequence number associated with each block of data, a last sequence number record to store a last sequence number associated with a last block of data received by the queue, and a table to store a last sequence number received from each succeeding storage system connected to the storage subsystem,
- wherein each storage subsystem includes a processor configured, in case of a failure of one or more storage subsystems, to compare the last sequence number stored in the last sequence number record of the storage subsystem with the last sequence numbers stored in the last sequence number record of other surviving storage subsystems and, if the last sequence number stored in any one of the other surviving storage subsystems is larger than the last sequence number stored in the storage subsystem, to copy blocks of data from the one surviving storage subsystem having associated sequence numbers higher than the last sequence number of the storage subsystem to the queue of the storage subsystem.

* * * * *